US006662921B2

United States Patent
Yoshida et al.

(10) Patent No.: US 6,662,921 B2
(45) Date of Patent: Dec. 16, 2003

(54) WHEEL STEERING APPARATUS

(75) Inventors: Isamu Yoshida, Iwata (JP); Keisuke Kazuno, Iwata (JP); Koji Sato, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/187,366

(22) Filed: Jul. 2, 2002

(65) Prior Publication Data
US 2003/0006120 A1 Jan. 9, 2003

(30) Foreign Application Priority Data

Jul. 5, 2001 (JP) ........................................ 2001-204288
Jun. 10, 2002 (JP) ........................................ 2002-168681

(51) Int. Cl.[7] ............................ B62D 3/00; F16D 15/00
(52) U.S. Cl. ............................. 192/37; 192/38; 74/89.38
(58) Field of Search ....................... 192/223.2, 38, 192/37, 44; 74/89.38, 89.41; 180/444, 445

(56) References Cited
U.S. PATENT DOCUMENTS

| | | | |
|---|---|---|---|
| 4,852,707 A | * 8/1989 | Ito et al. ........................ 192/44 |
| 4,901,831 A | * 2/1990 | Ito et al. ........................ 192/38 |
| 4,987,788 A | * 1/1991 | Bausch ....................... 74/89.34 |
| 5,027,915 A | * 7/1991 | Suzuki et al. ............... 180/443 |
| 5,083,626 A | * 1/1992 | Abe et al. .................... 180/445 |
| 5,135,084 A | * 8/1992 | Ito et al. ........................ 192/38 |
| 5,285,867 A | * 2/1994 | Pedersen et al. ............ 180/321 |

* cited by examiner

Primary Examiner—Richard M. Lorence
(74) Attorney, Agent, or Firm—Sughrue Mion, PLLC

(57) ABSTRACT

To provide a wheel steering apparatus capable of exhibiting a stabilized vehicle steerability without transmitting an external disturbance torque to a motor rotor even when the wheel receives an axially acting external force, this wheel steering apparatus includes a reciprocatingly movable rod 3 drivingly connected with a support member 2 for steerably supporting a wheel 1, and a ball screw mechanism 5 for reciprocatingly moving the rod 3 in response to rotation of a drive motor 4. In a rotational transmission system for transmitting rotation of the drive motor 4 to a nut member 5b of the ball screw mechanism 5, a clutch assembly 6 defining a reverse input limiting means is provided for preventing a rotar of the drive motor 4 from being rotated by the external force acting on the wheel 1. This clutch assembly 6 used is of a design wherein although rotation can be transmitted from an input shaft to an output shaft, no rotation is transmitted from the output shaft to the input shaft.

7 Claims, 12 Drawing Sheets

Outer Race Free

Outer Race Rotating

WHEEL STEERING APPARATUS

BACKGROUND OF THE INVENTION

1. Field of the Invention

The present invention relates to a wheel steering apparatus for use in association with an active rear steering (ARS) system of an automotive vehicle or the like.

2. Description of the Prior Art

An automotive vehicle having its front wheels adapted to be steered through a steering wheel has recently come to employ an active rear steering (ARS) system. The ARS system is an electronic control system for monitoring the wheel speed of the front wheel pair of the automotive vehicle and for controlling the steering of the rear wheel angle so that the vehicle body can attain a target body slip angle. A wheel steering apparatus for the rear wheel pair that can be used in association with this system is generally so configured that a reciprocatingly movable rod drivingly connected with support members for the rear wheels can be reciprocatingly moved by an electronically controlled drive motor through a screw mechanism used to translate a rotary motion of the drive motor into a linear motion. The screw mechanism referred to above includes a nut member in the form of generally trapezoidal threads and a generally trapezoidal screw shaft defined by a portion of the rod such that the nut member in the form of the trapezoidal threads can be rotated by the drive motor to thereby move the screw shaft in a direction axially thereof.

While the trapezoidal threads can convert a rotational torque of the nut member caused by the drive motor into an axial thrust force (a positive thrust operation), the positive operating efficiency of the trapezoidal threads is generally 50% or lower and, therefore, a loss is considerably large. For this reason, it is generally considered necessary to employ a relatively large size drive motor.

As a means for substantially solving this problem, it is contemplated to substitute therefor a ball screw mechanism capable of securing a relatively high working efficiency regardless of operating directions. However, if the ball screw mechanism is used in the rear wheel steering apparatus, since the efficiency is high during a reverse operation, the steerability of the vehicle appears to be adversely affected as a result of increase of the torque generated in a rotor of the drive motor, when the rear wheel steering apparatus is affected by an external force which would act on the wheel steering apparatus when, for example, the vehicle then running is hit by crosswind.

SUMMARY OF THE INVENTION

In view of the foregoing, the present invention has its primary object to provide a wheel steering apparatus capable of exhibiting a stabilized vehicle steerability without transmitting an external disturbance torque to a motor rotor even when the wheel receives an axially acting external force.

It is another important object of the present invention to make it possible to assembly the wheel steering apparatus in a compact size and to reduce the number of assembling steps.

In order to accomplish the foregoing objects of the present invention, there is provided a wheel steering apparatus including a reciprocatingly movable rod drivingly connected with a support member for steerably supporting a wheel, and a ball screw mechanism. The ball screw mechanism includes an outer helical groove defined on at least a portion of an outer periphery of the rod, a nut member having an inner peripheral surface formed with an inner helical groove defined therein and relatively rotatably mounted on the rod with the inner helical groove aligned with the outer helical groove, and a series of balls rollingly accommodated in part within the outer helical groove and in part within the inner helical groove, which nut member is driven by a drive motor for reciprocatingly moving the rod to steer the wheel. The wheel steering apparatus also includes a reverse input limiting means provided in a rotational transmission system for transmitting rotation of the drive motor to the nut member. The reverse input limiting means referred to above is operable to prevent a rotor of the drive motor from being rotated in response to an external force acting on the wheel.

According to the present invention, since the rotation of the drive motor is transmitted to the steering rod through the ball screw mechanism, the working efficiency is high with a minimized loss and the drive motor of a compact size is sufficient. While the ball screw mechanism can exhibit a high efficiency even during a reverse drive operation, the provision of the reverse input limiting means is effective to prevent the rotor of the drive motor from being rotated by the effect of an external force which would act on the wheel steering apparatus when, for example, the vehicle then running is hit by crosswind. Accordingly, even though the wheel is affected by the axially acting external force, no external disturbance torque is transmitted to the rotor of the drive motor, thereby to exhibit a stabilized vehicle steerability.

Thus, since no external force is transmitted from the vehicle wheels to the motor rotor, a motor control system can be advantageously simplified. Also, even when the wheel steering apparatus is affected by the external force transmitted from the vehicle wheels, no retaining torque for the drive motor is necessary and, hence, the power consumption by the drive motor can be reduced. Where the vehicle wheels are steered by the utilization of the output from the drive motor, the use of the ball screw mechanism enables it to be rotated lightly and, accordingly, the drive motor can have a reduced capacity.

The reverse input limiting means may be a clutch assembly. This clutch assembly includes a rotatable input side ring and a rotatable output side ring and is operable to transmit rotation from a rotatable input side ring to a rotatable output side ring, but preventing the transmission of the rotation from the output side ring to the input side ring. By this function, even though the wheel is affected by the axially acting external force, no external disturbance torque is transmitted to the rotor of the drive motor, that is, a reverse input is limited and, accordingly it can have a stabilized vehicle steerability. This clutch assembly may be a two-way clutch assembly.

Specifically the clutch assembly may include an outer race fixed to a stationary member, in which the input side ring and the output side ring are inserted axially from opposite ends thereof to permit the outer race to rotatably support the input side ring and the output side ring, a plurality of engagement elements disposed between mutually confronting surface of the outer race and the output side ring for engaging the outer race and the output side ring together when the outer race and the output side ring undergo a relative rotation, and a retainer fixedly connected with the input side ring for displacing the engagement elements between an engaged operative position and a non-engaged position. The retainer and the output side ring are connected with each other for angular play in a direction of rotation. The magnitude of play of the retainer relative to the output side ring is preferably so chosen as to be virtually equal to, for example, the distance over which the engagement elements move from the non-engaged neutral position to the engaged operative position. The engaged operative position is where the clutch assembly is held in a locked condition.

The clutch assembly of the above described construction operates in the following manner. When the input side ring and the output side ring undergo a relative rotation with each other, the retainer fixed to the input side ring rotates relative to the output side ring an angular distance corresponding to the magnitude of play in the direction of rotation and, in response to the rotation of the retainer, the engagement elements displace towards the engaged operative position. When starting from this condition the input side ring further rotates, the input side ring and the output side ring are connected together through the retainer and, therefore, the output side ring rotates and the rotation thereof is consequently transmitted to an output side. Conversely, when starting from the above described condition the output side ring is rotated in a reverse direction by the effect of, for example, the axially acting force imposed on the wheel, the engagement elements then held at the engaged operative position are locked with the output side ring consequently coupled with the outer race. Coupling of the outer side ring with the outer race results in interlocking of the output side ring with the outer race and no rotation is therefore transmitted to the input side ring. Thus, although the rotation can be transmitted from the input side ring to the output side ring, transmission of the rotation from the output side ring to the input side ring is interrupted.

In this clutch assembly, the engagement elements may be of a type operable to engage the outer race and the input side ring with each other in two directions with respect to the direction of rotation. By this arrangement, even when the wheel is affected by the external force in any direction, no disturbance torque will be transmitted to the rotor of the motor and, hence, a further stabilized vehicle steerability can be obtained.

In the wheel steeling apparatus according to the present invention, where the reverse input limiting means is a clutch assembly, component parts of the clutch assembly and the nut member of the ball screw mechanism may be integrated together to form respective parts of one-piece component.

Integration of the component parts of the clutch assembly with the nut member of the ball screw mechanism makes it possible to achieve a structure compact in size in an axial direction with no necessity to connect the clutch assembly and the nut member together during the assemblage, resulting in reduction in the number of the assembling steps. Also, possible generation of rattling motion of the nut member of the ball screw mechanism which would result from a poor precision of connection between the component parts of the clutch assembly and the nut member of the ball screw mechanism can be relieved, thereby stabilizing the working torque.

The one-piece component referred to above may include the output side ring and the nut member of the ball screw mechanism integrated together. In such case, the clutch assembly may include an outer race fixed to a stationary member with the output side ring of the one-piece component being provided rotatably coaxially of the outer race, a plurality of engagement elements disposed between mutually confronting surface of the outer race and the output side ring for engaging the outer race and the output side ring together when the outer race and the output side ring undergo a relative rotation, a retainer fixedly connected with the input side ring for displacing the engagement elements between an engaged operative position and a non-engaged position and interlocked with the input side ring, and a connecting means for connecting the input side ring with the output side ring for angular play in a direction of rotation. Interlocking of the retainer with the input side ring may be accomplished by the use of an integral component parts in which the retainer and the input side ring are integrated together, or may be accomplished by connecting the retainer separately with the input side ring.

The clutch assembly of this design operates in the following manner. Let it be assumed that in a rotation halted condition the engagement elements are held at the engaged operative position. Starting from this condition and when the output side ring is tended to rotate, the engagement elements held at the engaged operative position causes the outer race and the output side ring to be engaged with each other, that is, to be locked with each other. The outer race is fixed to the stationary member and is hence in a fixed condition and, accordingly, the output side ring is barred from rotating due to its engagement with the outer race through the engagement elements, with no rotation consequently transmitted to the input side ring. When in this condition the input side ring is rotated, the retainer integral with this input side ring rotates, causing the engagement elements to displace towards the non-engaged position to thereby release the lock. Further rotation of the input side ring results in connection of the connecting means, then in a play condition, with the output side ring with the rotation of the input side ring consequently transmitted to the output side ring. In this way, while the rotation can be transmitted from the input side ring to the output side ring, the transmission of the rotation from the output side ring to the input side ring can be interrupted.

Even this clutch assembly of the above described construction may be a two-way clutch assembly. In such case, an outer surface of the output side shaft may be formed with a flat cam face or two directional cam face portions inclined in respective directions opposite to each other in the direction of rotation, and rollers may be interposed between the cam face portions and the outer race, each of said rollers serving as the respective engagement element.

According to this design, in the event that while the engagement elements are held at the engaged operative position of the cam faces the output side ring is tended to rotate, rotation in one direction is locked by engagement of the rollers at the cam face portions in such one direction while rotation in the other direction is locked by the cam face portions in such other direction. Accordingly, rotation in these two directions counter to each other is interrupted. On the other hand, in the event of rotation of the input side ring, regardless of whether it rotate in any of the opposite directions, the retainer causes the engagement elements towards the non-engaged position to thereby release the lock with the connecting means consequently held in position to connect with the output side ring to thereby transmit the rotation and, accordingly, transmission of the rotation to the output side ring is possible. In this way, even though the wheel is affected by an external force in any direction, no disturbance torque is transmitted to the rotor of the drive motor and, accordingly it can have a stabilized vehicle steerability.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
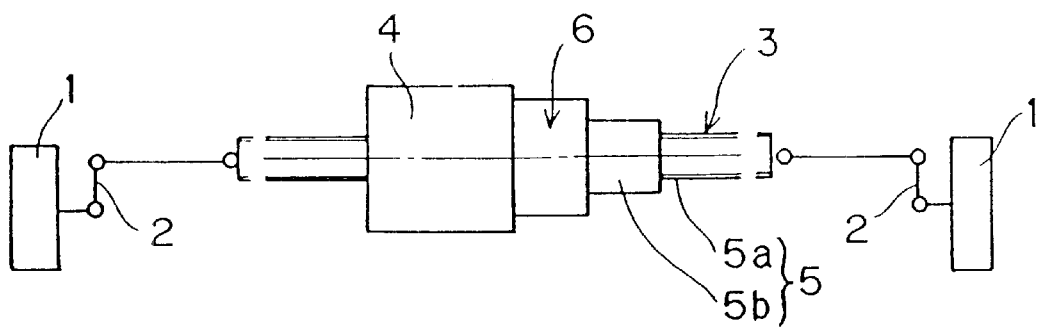
FIG. 1 is a schematic diagram showing an overview of a wheel steering apparatus according to a first preferred embodiment of the present invention.

A wheel steering apparatus according to a first preferred embodiment of the present invention will now be described with particular reference to FIGS. 1 to 6. The wheel steering apparatus shown therein includes a reciprocatingly movable rod 3 drivingly coupled with support members 2 for steerably supporting respective wheels 1, a ball screw mechanism 5 adapted to be driven by, for example, an electric drive motor 4 for reciprocatingly or axially driving the rod 3, and a clutch assembly 6 disposed in a drive transmission system for transmitting a rotatory drive from the drive motor 4 to a nut member 5b of the ball screw mechanism 5. The clutch assembly 6 serves as a reverse input limiting means for preventing a rotor of the drive motor 4 from being rotated by an external force transmitted thereto from the wheels 1. The drive motor 4, the clutch assembly 6 and the ball screw mechanism 5 are, in the illustrated embodiment, arranged in axial line with each other. The support members 2 referred to above may be a knuckle arm or the like. This wheel steering apparatus may be utilized to control a rear wheel steering of the vehicle of a type where the steering wheel is drivingly coupled with the front wheels. Accordingly, the wheels 1 so far shown are rear wheels.

Figure 2:
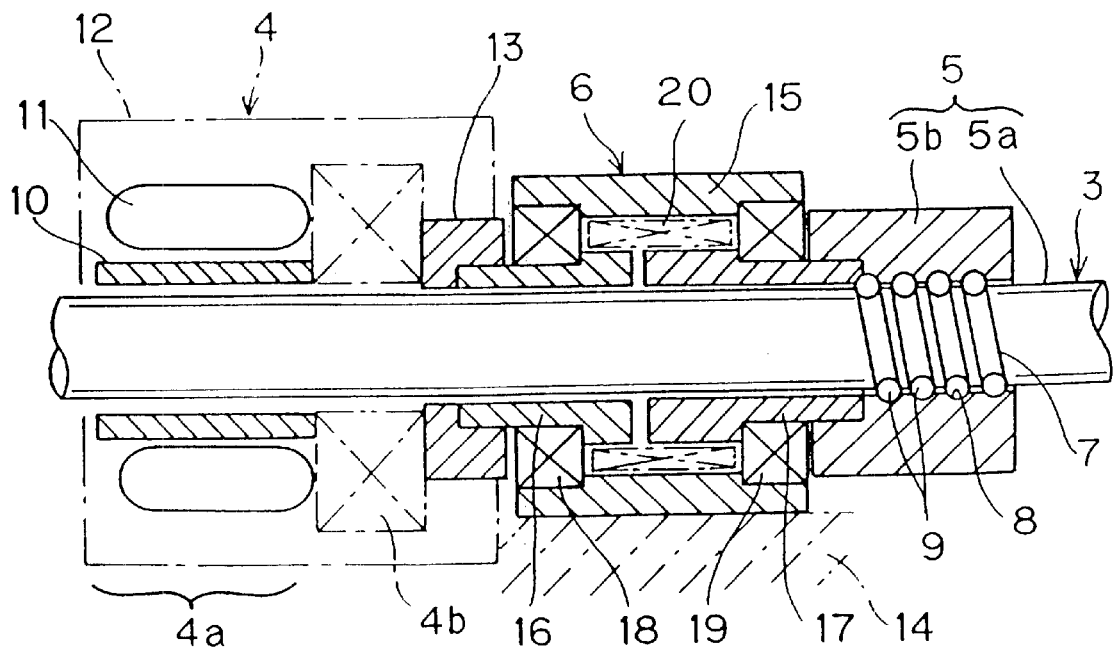
FIG. 2 is a schematic longitudinal sectional view of the wheel steering apparatus shown in FIG. 1.

The ball screw mechanism 5 is of a design including, as best shown in FIG. 2, a series of rolling elements, for example, balls 9 interposed in between a helical groove 7 defined externally in an outer periphery of the rod 3 and a helical groove 8 defined internally in an inner periphery of the nut member 5b that is mounted on that portion of the rod 3. A portion or the entire length of he rod 3 may be a screw shaft 5a. In an assembled condition with the nut member 5b mounted on the screw shaft 5a, the external and internal helical grooves 7 and 8 cooperate with each other to define a recirculating passage (not shown) along which the series of balls 9 rollingly circulates. As is well known to those skilled in the art, the recirculating passage is completed by communicating opposite ends of a helically extending tunnel, defined by and between the external and internal helical grooves 7 and 8, by means of a circulating element (not shown) such as bridge members or a return tube mounted in the nut member 5b.

The drive motor 4 referred to above is preferably of a kind having reduction gears built therein and, hence, includes a drive motor unit 4a and a reduction gear unit 4b. The drive motor unit 4a is made up of a cylindrical rotor 10, loosely mounted on the rod 3, and a stator 11 secured to a motor housing 12. On the other hand, the reduction gear unit 4b is operable to reduce the number of revolutions of the rotor 10 that is transmitted to a motor output shaft 13. This reduction gear unit 4b may be in the form of a planetary reduction gear unit. It is, however, to be noted that the drive motor 4 may not be equipped with the reduction gear unit 4b, in which case the motor output shaft 13 may be coupled directly with the rotor 10 or the drive motor 4 may be drivingly coupled with a clutch output shaft 16 of the clutch assembly 6 through a separate reduction gear unit (not shown).

The clutch assembly 6 is a two-way clutch assembly of a reverse input limiting type and is so designed and so configured that the rotary drive can be transmitted from the clutch input shaft 16, which is an input side ring in the form of an input sleeve, to an output shaft 17 which is an output side ring in the form of an output sleeve, but no rotary drive can be transmitted from the output shaft 17 to the input shaft 16.

The clutch assembly 6 operable in the manner described above includes an outer race 15 secured rigidly to a stationary member 14, and bearings 18 and 19 housed within the outer race 15 at respective locations adjacent opposite ends thereof for rotatably supporting the input and output shafts 16 and 17, respectively which are consequently rotatable with respect to each other. The stationary member 14 referred to above may be a portion of a vehicle chassis or the like. The input and output shaft 16 and 17 are inserted axially in the outer race 15 from opposite ends. Each of the bearings 18 and 19 may be employed in the form of a rolling bearing such as, for example, a ball bearing or the like. Each of the input and output shafts 16 and 17 is in the form of a quill shaft or sleeve through which the rod 3 loosely extends. The input and output shafts 16 and 17 are drivingly coupled with the rotor 10 of the drive motor 4 and the nut member 5a of the ball screw mechanism 5, respectively. More specifically, the input shaft 16 is drivingly coupled with the motor output shaft 13 of the drive motor 4. In the illustrated embodiment, the input shaft 16 is fixedly inserted into the motor output shaft 13 whereas the output shaft 17 is fixedly inserted into the nut member 5a such that the input and output shafts 16 and 17 can rotate together with the motor output shaft 13 and the nut member 5b, respectively.

Figure 3:
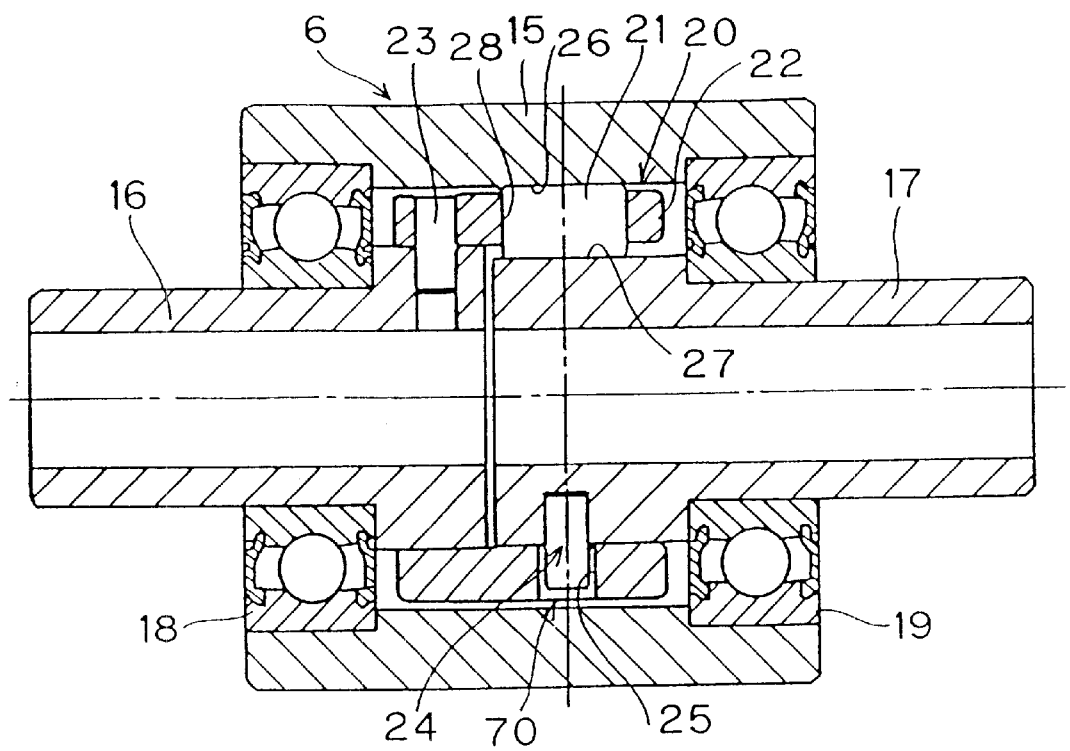
FIG. 3 is a longitudinal sectional view, on an enlarged scale, showing a clutch assembly employed in the wheel steering apparatus shown in FIG. 1.

As a clutching function unit 20 for transmitting a rotary drive between the input and output shafts 16 and 17 in a controlled manner, the clutch assembly 6 includes the following component parts. As best shown in FIG. 3, the clutch assembly 6 includes a plurality of, for example, four, engagement elements 21, each preferably in the form of a roller, disposed between respective inner and outer peripheral surfaces of the outer race 15 and the output shaft 17 and operable to engage the outer race 15 and the output shaft 17 together when the both undergo rotation relative to each other, and a generally cylindrical retainer 22 for operatively retaining the engagement elements 21. It is to be noted that the cylindrical retainer 22 is positioned inside the outer race 15 and has one end portion fixed on the input shaft 16 by means of one or more lock pins 23 passing through respective radial holes in the retainer 22 and then through corresponding radial holes in the input shaft 16. The retainer 22 has the opposite end portion mounted on the output shaft 17 and coupled thereto by means of a connecting means 70 for angular movement relative to the output shaft 17 through a predetermined angle about the longitudinal axis of the output shaft 17. The connecting means 70 referred to above includes a switching pin 24 radially outwardly protruding from the output shaft 17 and engaged in a loose receptor 25 such as, for example, a slot defined in the retainer 22 so as to extend circumferentially of the retainer 22.

Figure 4:
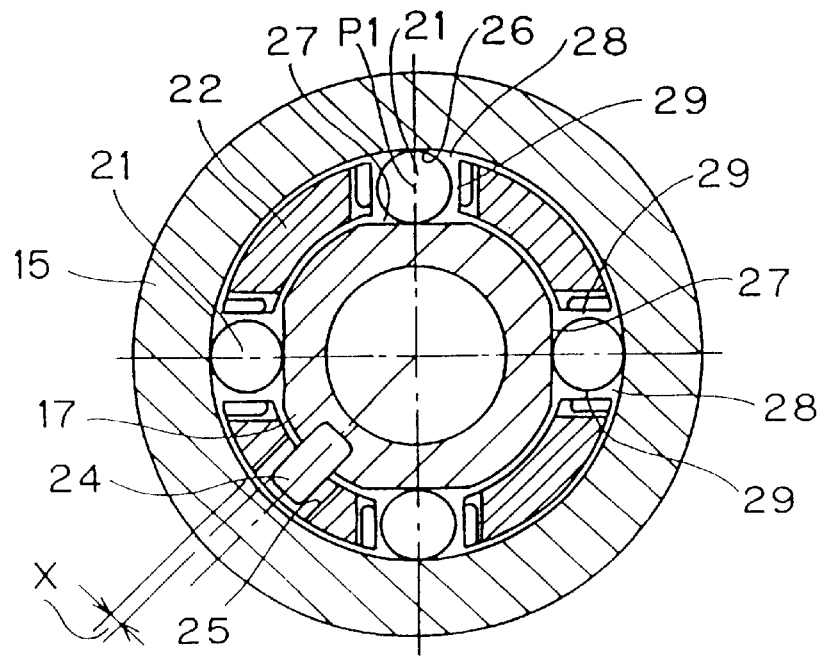
FIG. 4 is a transverse sectional view of the clutch assembly shown in FIG. 3.

A portion of the inner peripheral surface 26 of the outer race 15 confronting the output shaft 17 is defined by a cylindrical surface 26. The output shaft 17 is, as best shown in FIG. 4, formed with a plurality of cam faces 27, equal in number to the number of the engagement elements 21, that are defined on an outer peripheral surface of the output shaft 17 and spaced preferably an equal distance from each other in a direction circumferentially of the output shaft 17 in alignment with the associated engagement elements 21. Thus, the engagement elements 21 inside the outer race 15 are positioned between the cam faces 27 and portions of the inner peripheral surface 26 of the outer race 15 aligned with such cam faces 27, respectively.

Each of the cam faces 27 is in the form of a flat surface area lying parallel to a direction tangential to the shape of a cylinder originally assumed by the output shaft 17, so that the respective cam face 27 can cooperate with the associated portion of the inner peripheral surface 26 of the outer race 15 to define a wedge space where the corresponding engagement element 21 can be wedged. More specifically, the respective wedge space where the corresponding engagement element 21 is operatively accommodated is so configured as to decrease its radial distance, bound between the associated cam face 27 and the inner peripheral surface 26 of the outer race 15, in opposite directions circumferentially of the output shaft 17 while representing a symmetrical shape when viewed in a direction transverse to the longitudinal axis of the output shaft 17 as shown in FIG. 4.

The cylindrical retainer 22 referred to above has pockets 28 defined therein so as to be spaced a distance from each other in a circumferential direction thereof for accommodating the corresponding engagement elements 21. Each of the retainer pockets 28 has a width as measured in a direction circumferentially thereof and is of a size sufficient for the corresponding engagement element 21 to be loosely accommodated therein. With each engagement element 21 so accommodated within the corresponding retainer pocket 28 as best shown in FIG. 4, such engagement element 21 is biased from opposite directions by elastic elements 29, positioned on respective sides of the engagement element 21, so as to assume a neutral position P1 intermediate of the width of the respective retainer pocket 28. Each of the elastic elements 29 may be in the form of, for example, a leaf spring and is secured to the retainer 22.

Within each of the wedge spaces defined between the cam faces 27 and the inner peripheral surface 26 of the outer race 15, the corresponding engagement element 21 normally biased to the neutral position P1 as shown in FIG. 4 where it does not engage the output shaft 17 can move in either direction around the longitudinal axis of the output shaft 17 towards the most advanced position, that is, an engaged operative position P2, as shown in FIG. 5, where such engagement element 21 can be wedged in between the associated cam face 27 and that portion of the inner peripheral surface 26 of the outer race 15. Thus, each engagement element 21 can move the total distance that is double of the distance between the neutral position P1 and the engaged operative position P2 relative to the output shaft 17.

The magnitude of play of the retainer 22 relative to the output shaft 17, that is, the magnitude X of play of the switching pin 24 within the loose receptor 25 (in each of the opposite directions circumferentially around the output shaft 17) is so chosen as to be substantially equal to the distance over which the engagement element 21 moves from the neutral position P1 to the engaged operative position P2.

The operation of the wheel steering apparatus of the structure described above will now be described. Referring particularly to FIGS. 1 and 2, rotation of the rotor 10 of the drive motor 4 is transmitted to the nut member 5b of the ball screw mechanism 5 through the clutch assembly 6 and as the nut member 5b is so driven, the rod 3 forming the screw shaft 5a is axially moved. This axial movement of the rod 3 results in steering of the wheels 1 through the associated support members 2. Since the rotation of the drive motor 4 is transmitted to the rod 3 through the ball screw mechanism 5, a high transmission efficiency with a minimized loss can be achieved rendering the drive motor 4 compact in size. While the ball screw mechanism 5 can exhibit a high efficiency even during a movement reverse to that described above, the provision of the clutch assembly 6 defining the reverse input limiting means discussed above is effective to prevent the rotor 10 of the drive motor 4 from being rotated by an external force which would act on the wheel steering apparatus when, for example, the vehicle then running is hit by crosswind. Accordingly, even though the wheels 1 is hit by an axially acting external force, no disturbance torque will not be transmitted to the motor rotor 10, resulting in a stabilized vehicle maneuverability.

The clutch assembly 6 employed in the wheel steering apparatus of the present invention functions in the following manner as the reverse input limiting means. Briefly speaking, a torque T1 (FIG. 6A) from the input shaft 16 is normally transmitted directly to the output shaft 17 through the switching pin 24 (FIG. 5). However, as regards a reverse input torque T2 (FIG. 6B) from the output shaft 17, the engagement elements 21 are engaged in between the respective cam faces 27 of the output shaft 17 and the inner peripheral surface 26 of the outer race 15, causing the input shaft 17 and the outer race 15 to be rotated simultaneously. However, since the outer race 15 is locked to the stationary member 14 as shown in FIG. 2, the reverse input torque T2 is not transmitted from the output shaft 17 to the input shaft 16.

Figure 5A:
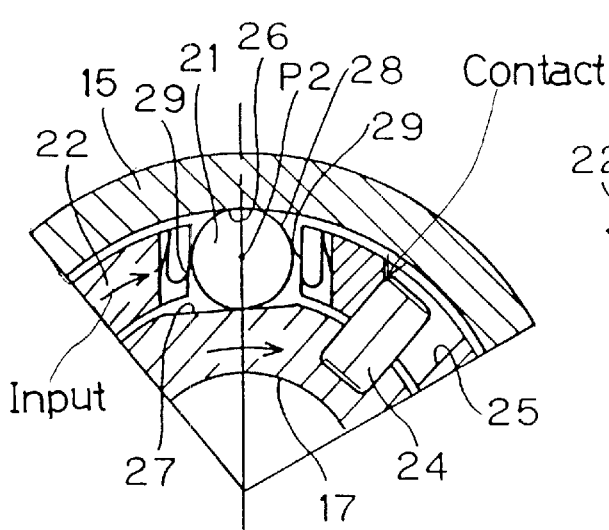
FIGS. 5A and 5B are fragmentary transverse sectional views showing the clutch assembly of FIG. 3 in different operative positions, respectively.
Figure 5B:
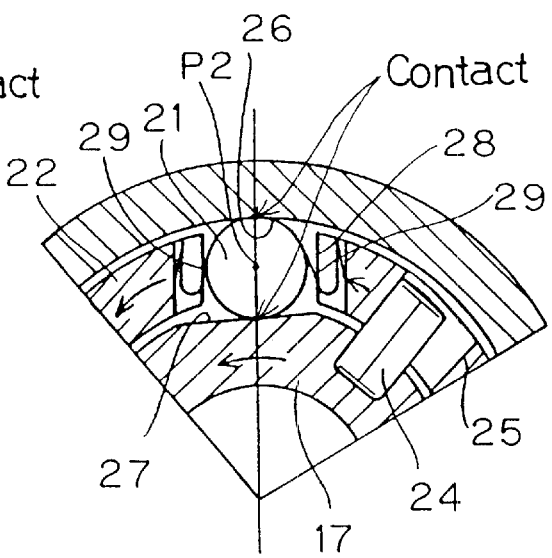
Figure 6A:
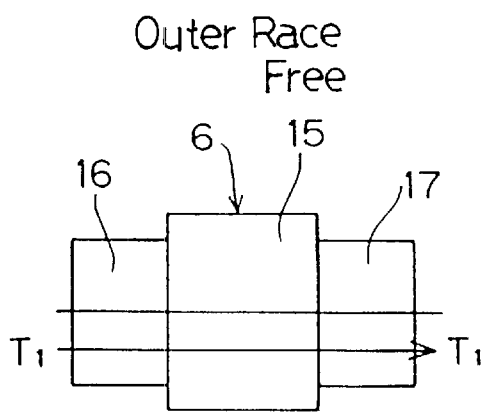
FIGS. 6A and 6B are schematic side views of the clutch assembly showing the operation thereof when an outer race is in a freely rotatable condition and in a rotating condition, respectively.
Figure 6B:
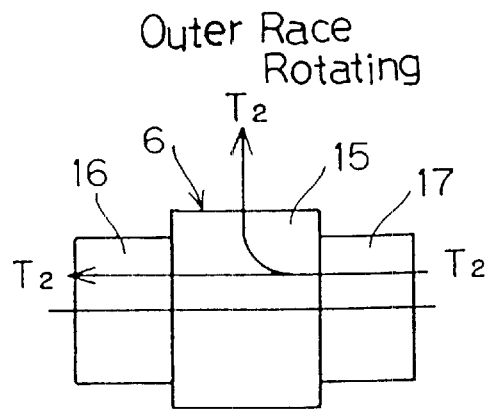

More specifically, referring now to FIGS. 3 and 4, when the input shaft 16 and the output shaft 17 rotate relative to each other, the retainer 22 fixed to the input shaft 16 rotates relative to the output shaft 17 a distance corresponding to the play thereof around the output shaft 17 and, in response to this rotation of the retainer 22, the engagement elements 21 displace towards the engaged operative position P2 as shown in FIG. 5A. Starting from this condition, further rotation of the input shaft 16 results in interconnection of the input shaft 16 and the output shaft 17 through the retainer 22 and the switching pin 24, wherefore the output shaft 17 is driven with its rotation transmitted to an output side 17. Conversely, starting from the above discussed condition, when the output shaft 17 is urged to rotate in a reverse direction by the effect of the axial force acting on the wheels 1 (FIG. 1) as shown in FIG. 5B, the engagement elements 21 then held at the engaged operative position P2 are locked with the output shaft 17 and the outer race 15 interconnected with each other. By this interconnection, the output shaft 17 is locked with the outer race 15 and no rotation is transmitted to the input shaft 16. In this way, the clutch assembly 6 is so designed and so configured as to transmit the rotation from the input shaft 16 to the output shaft 17, but not from the output shaft 17 to the input shaft 16.

It is to be noted that the clutch assembly 6 has the engagement elements 21 operable to engage the outer race 15 and the output shaft 17 in any one of the rotational directions counter to each other.

Figure 7:
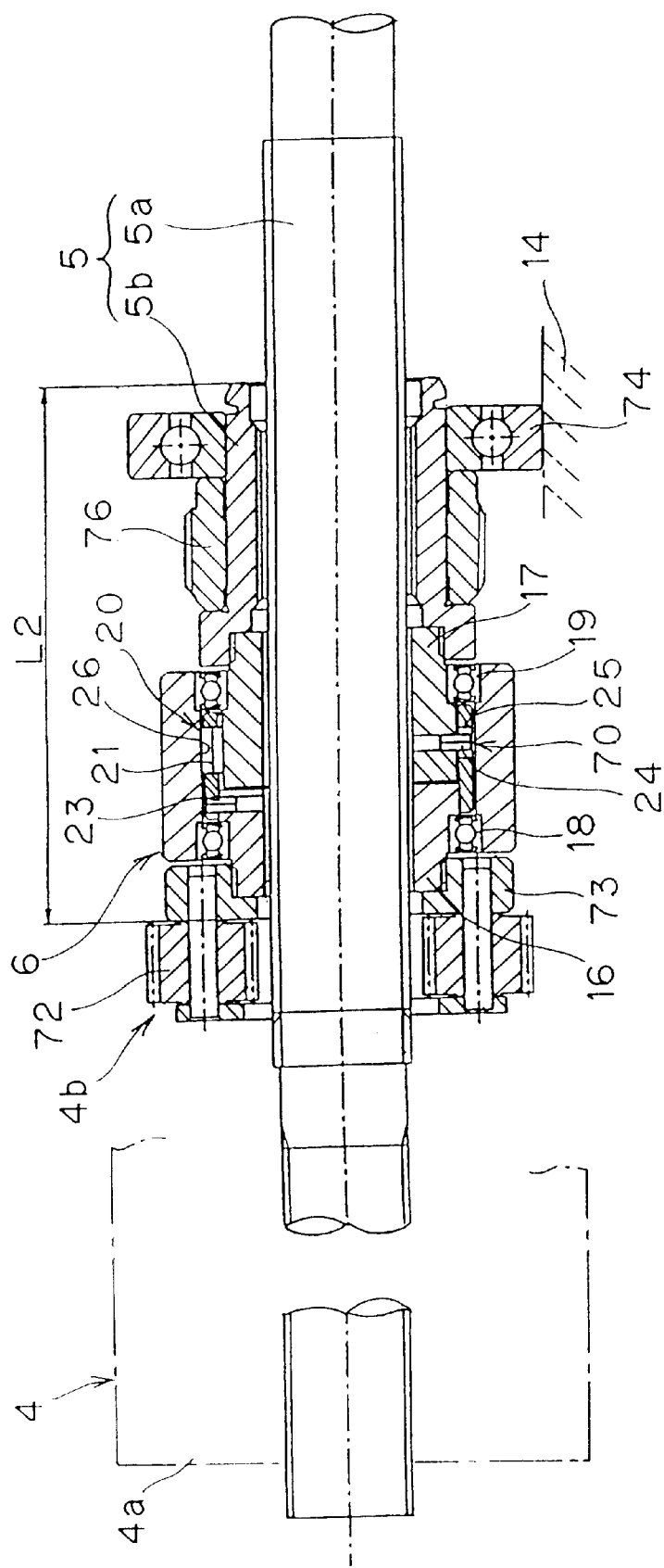
FIG. 7 is a longitudinal sectional view of the wheel steering apparatus according to a second preferred embodiment of the present invention, showing the details of the clutch assembly and a ball screw mechanism both employed therein.
Figure 8:
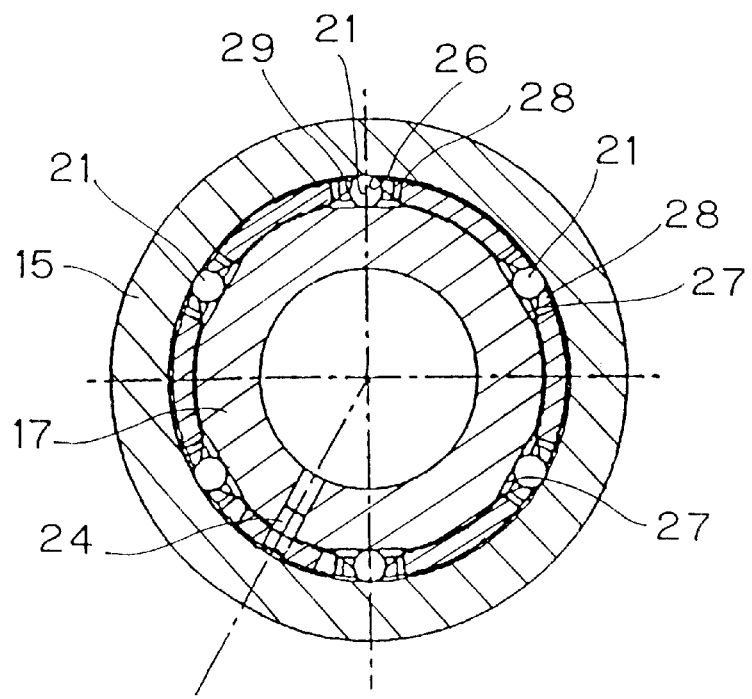
FIG. 8 is a transverse sectional view, on an enlarged scale, showing the clutch assembly employed in the wheel steering apparatus of FIG. 7.
Figure 9:
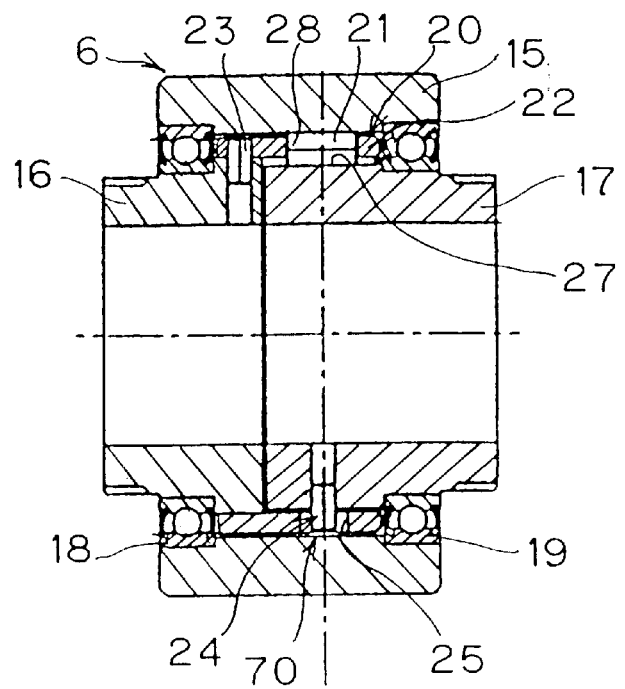
FIG. 9 is a longitudinal sectional view of the clutch assembly shown in FIG. 8.

FIGS. 7 to 9 illustrates the wheel steering apparatus according to a second preferred embodiment of the present invention. The wheel steering apparatus shown therein differs from that according to the previously described embodiment in that in the second embodiment a yoke 73 carrying a planetary gear 72 forming a part of the reduction gear unit 4b is utilized as means for transmitting rotation from the drive motor 4 to the input shaft 16 of the clutch assembly 6. While the details of the reduction gear unit 4b will not be herein described for the sake of brevity, the reduction gear unit 4b is of a planetary reduction gear design wherein rotation of the yoke 73 represents a speed-reduced output of the reduction gear unit 4b. The yoke 73 is fixedly mounted on an outer periphery of the input shaft 16 of the clutch assembly 6 for rotation together therewith. The reduction gear unit 4b may be provided separate from the drive motor 4, in which case the drive motor 4 may be of a design having no reduction gear unit built therein. The nut member 5b of the ball screw mechanism 5 is rotatably supported by the stationary member 14 such as, for example, a vehicle chassis through a bearing 74, with a ring member 76 mounted externally on an outer periphery of the nut member 5b. This ring member 76 has its outer periphery formed with a gear portion that may be used for the detection of rotation of the nut member 5b. As shown in FIG. 8, the number of the cam faces 27 employed in the clutch assembly 6 in the embodiment shown in FIGS. 7 to 9 is greater than that in the first embodiment, but may be equal to that in the first embodiment.

The second embodiment shown in and described with reference to FIGS. 7 to 9 may be regarded as more specific than the previously described first embodiment and, except for those described with reference to FIGS. 7 to 9, the details thereof are substantially identical with those in the previously described first embodiment.

A third preferred embodiment of the present invention is shown in FIGS. 10 to 13. The wheel steering apparatus according to this embodiment is substantially similar to that according to the first embodiment shown in and described with reference to FIGS. 1 to 6, except for the following structural features. It is, however, to be noted that even in this embodiment shown in FIGS. 10 to 13, the clutch assembly 6, now identified by 6C, is a two-way clutch assembly of a reverse input limiting type that is, as regards the rotations in opposite directions are concerned, operable to transmit rotation from an input side ring 16C to an output side ring 17C, but to interrupt transmission of rotation from the output side ring 17C to the input side ring 16C.

More specifically, in the embodiment shown in FIGS. 10 to 13, the output side ring 17C of the clutch assembly 6C and the nut member 5b of the ball screw mechanism 5C are respective integral parts of a one-piece component 80. One axial end portion of the one-piece component 80 defines the output side ring 17C and the opposite axial end portion of such one-piece component 80 defines the internally threaded nut member 5b. This one-piece component 80 can be prepared by grinding a common raw material or by means of a powdery metallurgical technique or the like. The ball screw mechanism 5C employed therein is substantially similar to the ball screw mechanism 5 employed in the previously described first embodiment except that the nut member 5b is an integral part of the one-piece component 80 as described above. This one-piece component 80 is rotatably mounted on the stationary member 14 such as, for example, the vehicle chassis or the like through the bearing 74 by way of the nut member 5b having the bearing 74 mounted thereon. The nut member 5b has its outer periphery on which the ring member 76 is mounted in a manner similar to that in the embodiment shown in and described with reference to FIG. 7.

The clutch assembly 6C is of a design wherein the output side ring 17C of the one-piece component 80 described above is disposed inside the outer race 15C, fixed to the stationary member 14, for rotation coaxial with the outer race 15C. The engagement elements 21C for engaging the outer race 15C and the output side ring 17C together when the both undergo a relative rotation, and the retainer 22C operable to move the engagement elements 21C between the engaged operative position and the disengaged position are interposed between respective mating surfaces of the outer race 15C and the output side ring 17C. Each of the engagement element 21C is in the form of a roller and concurrently serves as a rolling element for rotatably supporting the output side ring 17C relative to the outer race 15C. The retainer 22C is of a cylindrical configuration having a plurality of pockets 28 defined therein in a direction circumferentially thereof with the associated engagement elements or rollers 21C accommodated therein. The retainer 22C may be interlocked with the input side ring 16C and, in the illustrated embodiment, the retainer 22C is integrally formed with the input side ring 16C. This retainer 22C may be a component part separate from the input side ring 16C, in which case such separate component part has to be fixed to the input side ring 16C.

The input side ring 16C is in the form of a generally ring shaped component loosely mounted on the screw shaft 5a of the ball screw mechanism 5. This input side ring 16 concurrently serves as a component part of the reduction gear unit for reducing the number of revolution of the drive motor 4. Specifically, the input side ring 16C includes a yoke carrying the planetary gear 72 forming a part of the reduction gear unit 4b of the planetary gear type that has been described as employed in the embodiment shown in and described with reference to FIG. 7. The connecting means 70 for connecting the input side ring 16C and the output side ring 17C together for love movement relative to each other in a circumferential direction thereof is interposed between the input side ring 16C and the output side ring 17C. This connecting means 70 includes an engaged portion 25C provided in an end face of the output side ring 17C and an engagement portion 24C provided in the input side ring 16C and engageable with the engaged portion 25C. The engaged portion 25C may be a recess and is, in the illustrated embodiment, defined by a groove defined in the end face of the output side ring 17C so as to extend in a direction radially thereof. On the other hand, the engagement portion 24C may be a projection and is, in the illustrated embodiment, constituted by a pin. The engagement portion 24C constituted by the pin is specifically defined by an other end of a corresponding spindle 81 extending through the input side ring 16C, constituted by the yoke, and supporting the planetary gear 72. This engagement portion 24C corresponds functionally to the switching pin 24 employed in the previously described first embodiment.

Figure 11A:
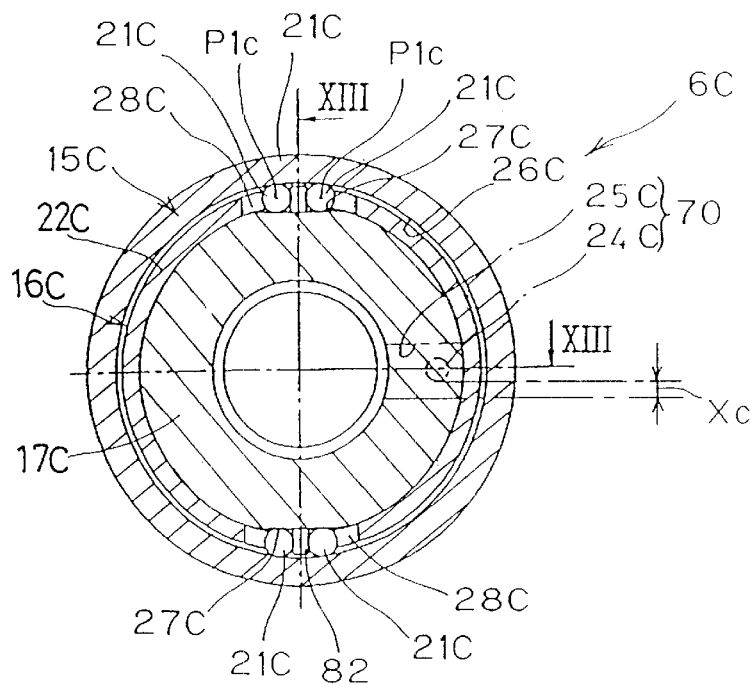
FIG. 11A is a transverse sectional view, on an enlarged scale, showing the clutch assembly employed in the wheel steering apparatus of FIG. 10.
Figure 11B:
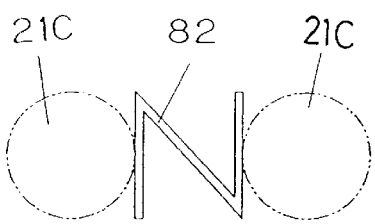
FIGS. 11B and 11C are schematic front elevational views of different elastic members employed in the clutch assembly of FIG. 11A.
Figure 11C:
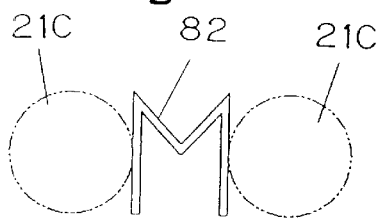
Figure 12:
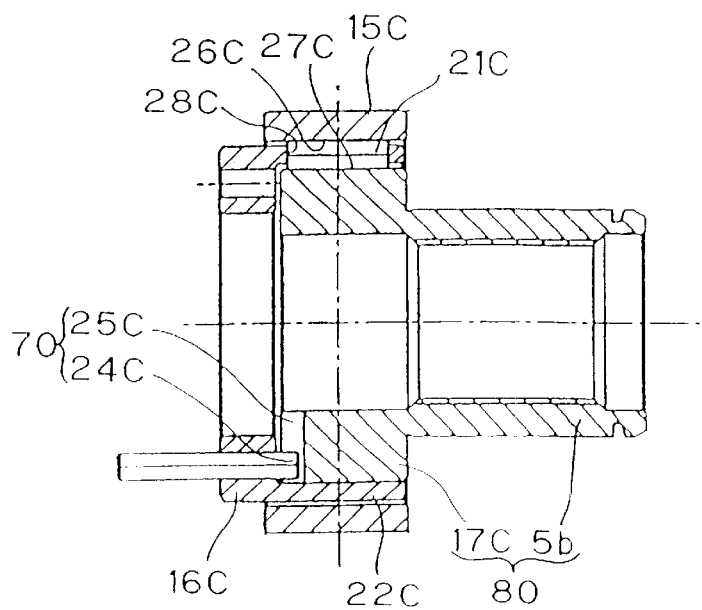
FIG. 12 is a cross-sectional view taken along the line XII—XII in FIG. 11A.

As best shown in FIG. 11, the outer race 15C has an inner peripheral surface that is a cylindrical surface 26C facing the output side ring 17C. The output side ring 17C has its outer peripheral surface formed with a plurality of, for example, two cam faces 27C spaced a distance from each other in a direction circumferentially thereof, with an engagement element 21C positioned between each cam face 27C and the cylindrical inner peripheral surface 26C of the outer race 15C. Each of the cam faces 27C is a surface area cooperable with the cylindrical inner peripheral surface 26C of the outer race 15C to define a corresponding wedge space in which the associated engagement element 21C is wedged. Each of the cam faces 27C is in the form of a flat surface area lying parallel to a direction tangential to the shape of a cylinder originally assumed by the output side ring 17C and defines, as the wedge space, the wedge space on respective sides of the associated engagement element 21 with respect to the opposite directions of rotation. More specifically, each of the cam faces 27C is in the form of a flat surface area defined by cam face portions $27C_1$ and $27C_2$ as shown in FIG. 13 in two directions inclined in a direction counter to the circumferential direction, with the wedge space in each of the opposite directions being defined by the cam face portions $27C_1$ and $27C_2$. The opposite wedge spaces are of a shape symmetrical with each other. For each cam face 27C, two engagement elements 26C are disposed and positioned in the cam face portions $27C_1$ and $27C_2$, respectively. An elastic member 82 for urging the paired engagement elements 26C in respective directions away from each other is interposed between the paired engagement elements 26C. With the paired engagement elements 26C so urged by the associated elastic member 82, the paired engagement elements 26C on respective sides of the respective elastic member 82 are urged towards the cam face portions $27C_1$ and $27C_2$, respectively. Each of the elastic members 82 may be any elastic member of any suitable shape capable of urging the paired engagement elements 26C in the opposite directions away from each other. By way of example, each of the elastic members 82 may be a generally N-shaped leaf spring as shown in FIG. 11B or a generally M-shaped leaf spring as shown in FIG. 11C. Alternatively, a coil spring can be employed for each of the elastic members 82.

The retainer 22C referred to above is of a cylindrical configuration having pockets 28C defined therein so as to be spaced a distance from each other in a circumferential direction thereof, each of said pockets 28C being so sized as to loosely accommodate the paired engagement elements 21C therein. Thus, within each of the pockets 28C, the paired engagement elements 21C and the associated elastic member 82 are accommodated.

Figure 13A:
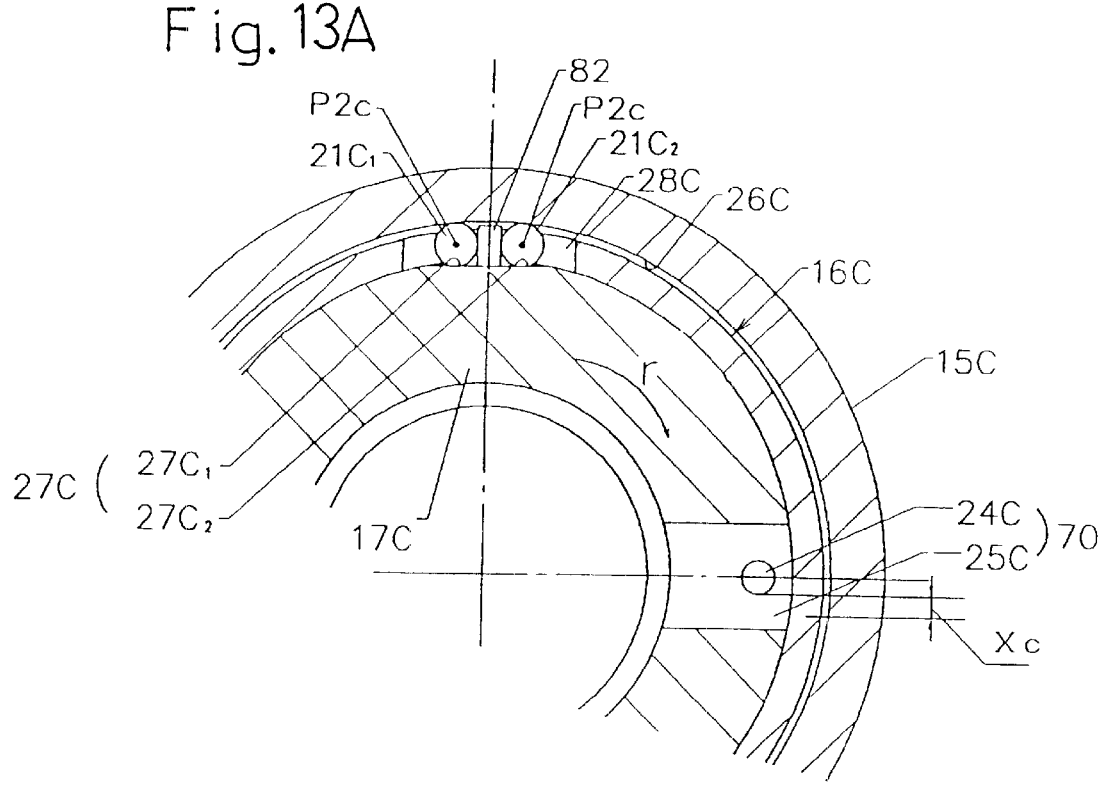
FIGS. 13A and 13B are fragmentary transverse sectional views, on an enlarged scale, showing the clutch assembly of FIG. 10A in different operative positions, respectively.
Figure 13B:
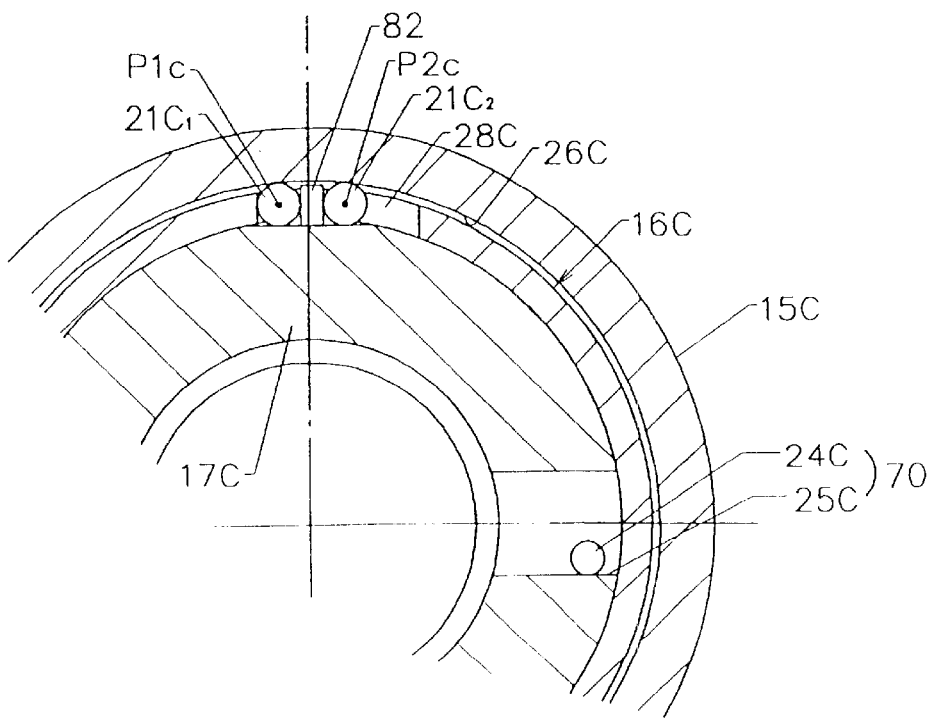

With the paired engagement elements 21C so accommodated within the corresponding retainer pocket 28C as best shown in FIG. 11, such engagement elements 21 are movable relative to the output side ring 17C between an engaged operative position P2c (as shown in FIG. 13A, from which the engagement elements 21C starts entering the associated wedge spaces defined between the cylindrical inner surface 26C of the outer race 15C and the cam face portions $27C_1$ and $27C_2$, and a non-engaged position P1c as shown in FIG. 13B.

The magnitude of play Xc defined by the connecting means 70 for allowing the input side ring 16C to be displaceable relative to the output side ring 17C in a direction circumferentially thereof, that is, the magnitude of play Xc in which the engagement portion 24C comprised of the pin can play within the engaged portion 25C comprised of the recess is set to a value substantially equal to the distance of movement of the engagement elements 21C from the non-engaged position P1c to the engaged operative position P2c. It is to be noted that the magnitude of play Xc is that in each of the opposite directions circumferentially around the output shaft 17.

Figure 10:
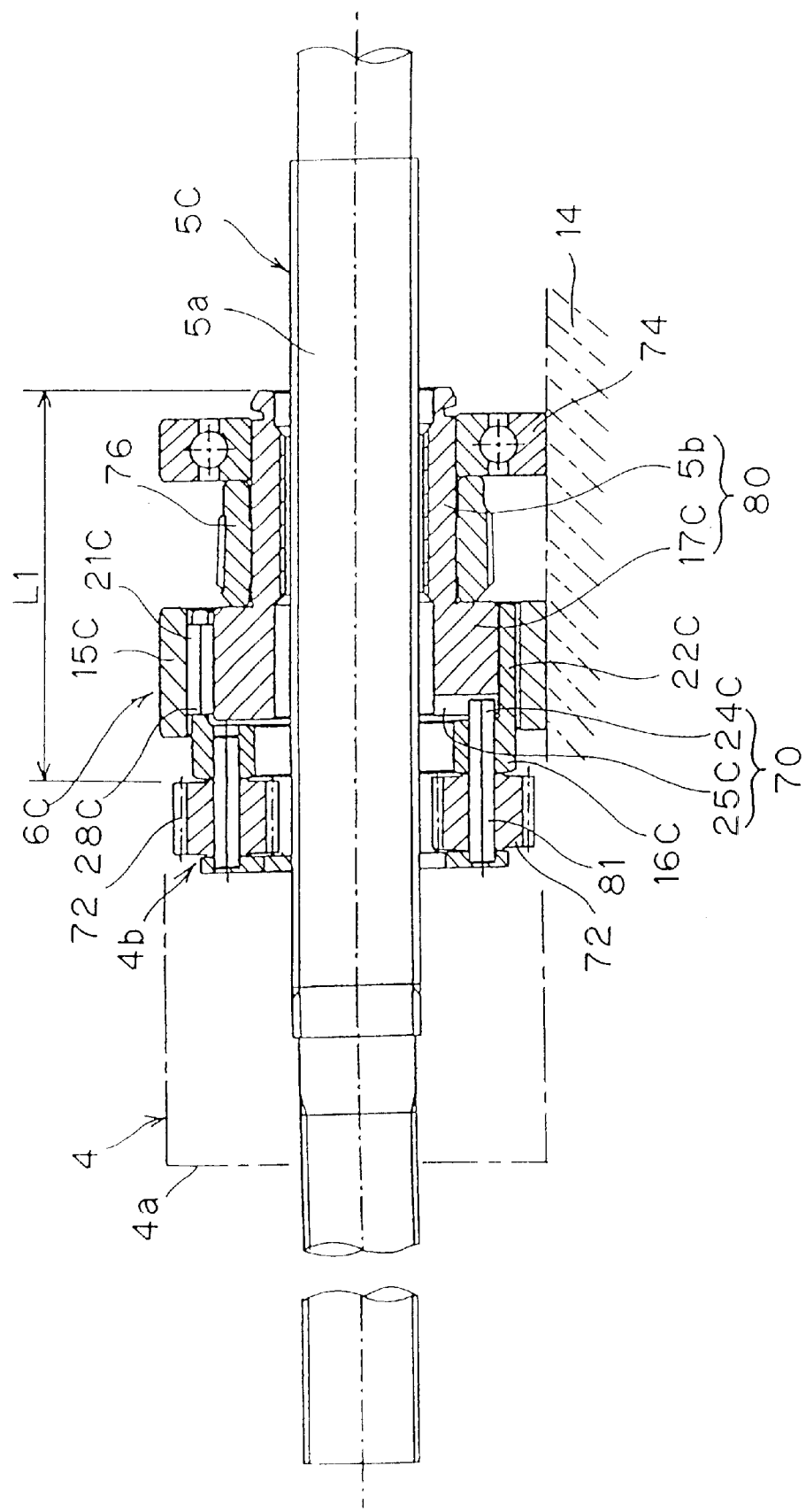
FIG. 10 is a longitudinal sectional view of the wheel steering apparatus according to a third preferred embodiment of the present invention, showing the details of the clutch assembly and a ball screw mechanism both employed therein.

The clutch assembly 6C of the structure in accordance with the third embodiment of the present invention will now be described. This clutch assembly 6C is of a design wherein the retainer 22C applies a rotational input together with the input side ring 16C. So long as no rotation occurs, as shown in FIG. 13A, the engagement elements 21C are biased by the respective elastic member 82 to assume the engaged operative position P2c at the cam face portions $27C_1$ and $27C_2$ of the output side ring 17C that serves as an inner race. Since the outer race 15C is fixed to the stationary member 14 which is a stationary system as shown in FIG. 10, an attempt to rotate the output side ring 17C in a clockwise direction shown by the arrow r in FIG. 13A causes one of the paired engagement elements $21C_1$, which is positioned on a trailing side with respect to the direction r of rotation of the output side ring 17C as viewed in FIG. 13A, to lock and, accordingly, rotation of the output side ring 17C is halted. On the other hand, when the output side ring 17C is tended to rotate counterclockwise as viewed in FIG. 13A, the other of the paired engagement elements $21C_2$, which is positioned on a leading side with respect to the direction r shown in FIG. 13A is locked and, accordingly, rotation of the output side ring 17C is halted. Accordingly, the output side ring 17C cannot rotate in either direction about the longitudinal axis thereof On the other hand, when the input side ring 16C is rotated, that is, the retainer 22C rigid with the input side ring 16C is rotated in a direction, for example, clockwise as viewed in FIG. 13A, the engagement elements $21C_1$ positioned on the trailing side with respect to the clockwise direction of rotation of the retainer 22C are brought into contact with respective inner faces of the associated pockets 28C in the retainer 22C, resulting in rotation of the input side ring 16C. At this time, the engagement elements $21C_1$ on the trailing side are moved from the engaged operative position P2c towards the non-engaged position P1c, resulting in formation of a gap between the cylindrical inner peripheral surface 26C of the outer race 15C and the output side ring 17C serving as the inner race, wherefore the lock is released.

With further clockwise rotation of the input side ring 16c, the engagement element 24c, that is the switching pin fitted to the input side ring 16C, is brought into contact with an inner face of the non-engaged portion 25C comprised of the groove in the output side ring 17C as shown in FIG. 13B, causing the output side ring 17C directly to rotate. Although at this time, the output side ring 17C rotates in a clockwise direction as viewed therein, since the engagement elements 21C1 on the previously described locking side have been released from being locked by the retainer 22C, no locking action occur and the rotation of the input side ring 16C and, hence, the rotation of the retainer 22C is transmitted to the output side ring 17C. It is to be noted that the engagement elements $21C_2$, positioned on the leading side with respect to the clockwise direction of rotation of the input side ring 16C, are held at the engaged operative position P2c, but since the direction of rotation thereof is a non-locking direction, that is, a rotation towards a skirted area of the wedge spaces, no locking action takes place. Even when the input side ring 16C rotates in a counterclockwise direction, the operation similar to that described occurs except for the difference in direction of rotation.

Thus, while the torque can be transmitted from the input side ring 16C to the output side ring 17C, no torque can be transmitted from the output side ring 17C to the input side ring 16C, transmission from the output side ring 17C to the input side ring 16C being a reverse input.

According to the third embodiment described hereinabove, since the output side ring 17C, forming a part of the clutch assembly 6, and the nut member 5b of the ball screw mechanism 5 (FIG. 10) are integrated together to the one-piece component 80, an axially compact structure can be obtained. In other words, the axial length L1 of a combination of the clutch assembly 6C and the nut member 5b of the ball screw mechanism 5 can be reduced to a smaller value as compared with the axial length L2 where the output shaft 17 and the nut member 5b are separate from each other as shown in FIG. 7. For this reason, the space occupied by the wheel steering apparatus as a whole can be minimized, thereby suppressing increase of the weight of the vehicle as a whole.

Specifically, the wheel steering apparatus utilizing the ball screw mechanism 5 has an advantage in that as compared with the conventional wheel steering apparatus utilizing a slide screw the motor torque can be relieved. However, since the reverse input limiting clutch assembly 6 or 6C is employed in the wheel steering apparatus utilizing the ball screw mechanism 5, the space occupied by the apparatus as a whole tends to increase, accompanied by increase of the vehicle weight. Such a problem can be eliminated or relieved by the employment of the one-piece component 80 as hereinbefore discussed. Also, the use of the one-piece component 80 effectively eliminates connection between the clutch assembly and the nut member during assemblage and, therefore, the number of assembling steps can advantageously be reduced. Also, the possibility of the nut member 5b of the ball screw mechanism 5 undergoing an oscillating motion can be substantially eliminated which would otherwise occur as a result of reduction in connecting precision between the component parts of the clutch assembly 6C and the nut member 5b of the ball screw mechanism 5 and, therefore, an operating torque can advantageously be stabilized. Yet, in the case of the third embodiment of the present invention, since the input side ring 16C concurrently serves as a component part of the reduction gear unit, further compactization can be achieved.

It is to be noted that in the embodiment shown in and described with reference to FIGS. 10 to 13, the cam face portions $27C_1$ and $27C_2$ in the respective directions have been described as defined in the single cam face 27C, those cam face portions $27C_1$ and $27C_2$ may be defined as separated from each other in the circumferential direction with one engagement element 21C provided for each of those cam face portions $27C_1$ and $27C_2$. Also, even in the embodiment in which the one-piece component 80 is employed, one engagement element may be provided for one cam face as is the case with the previously described first embodiment of the present invention. In addition, in the first embodiment described hereinbefore, one engagement element 21 may be provided for each of cam face portions in the single cam face 27 in the respective directions.

Figure 14:
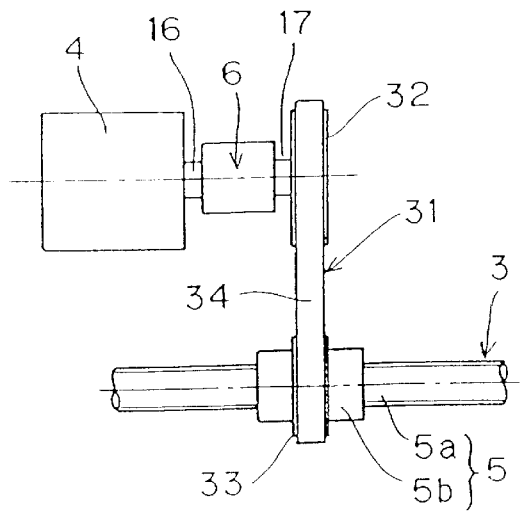
FIG. 14 is a schematic plan view of the wheel steeling apparatus according to a fourth preferred embodiment of the present invention.

A fourth preferred embodiment of the present invention will now be described with reference to FIG. 14. The wheel steering apparatus shown therein is featured in that the rod 3 and the drive motor 4 have their longitudinal axes offset laterally relative to each other. The nut member 5b of the ball screw shaft 5 is driven through a wrapping connector mechanism 31. The wrapping connector mechanism 31 includes a drive pulley 32, a driven pulley 33 formed or provided on an outer periphery of the nut member 5b, and an endless belt 34 trained between the drive and driven pulleys 32 and 33. The clutch assembly 6 that is a reverse input limiting means is disposed in a coaxial relation with the drive motor 4 and the output shaft 17 of the clutch assembly 6 is drivingly connected with the drive pulley 32. The clutch assembly 6 shown therein may be the one shown in FIGS. 2 to 6. It is, however, to be noted that in the instance now under discussion, the input shaft 16, which is an input side ring of the clutch assembly 6, and the output shaft 17 which is an output side ring thereof need not be a quill or hollow shaft.

Figure 15A:
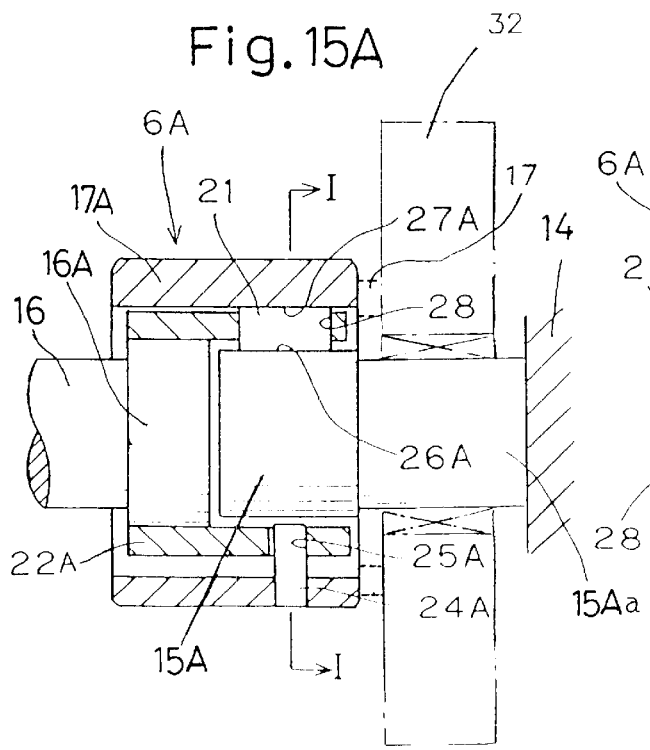
FIG. 15A is a longitudinal sectional view, on an enlarged scale, showing a modified form of the clutch assembly employed in the wheel steering apparatus shown in FIG. 14.
Figure 15B:
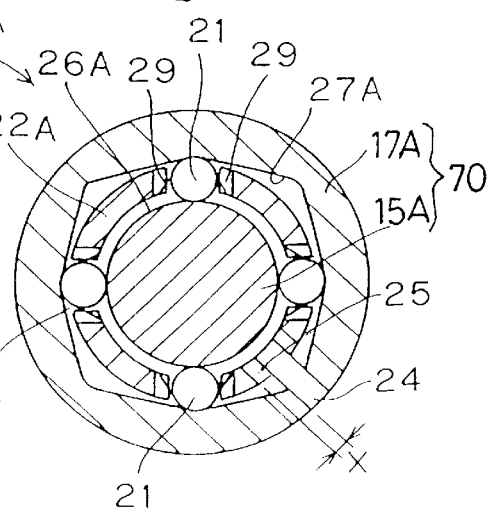
FIG. 15B is a cross-sectional view taken along the line I—I in FIG. 15A.

The clutch assembly used as the reverse input limiting means may be modified in numerous ways. One of those modifications is shown in FIG. 15. The clutch assembly now identified by 6A in FIG. 15 includes a fixed ring 15A serving as an inner race, and an outer race 17A serving as an output side ring and mounted coaxially on the fixed ring 15A for rotation relative to the latter. The fixed ring 15A is fixed to the stationary member 14. The engagement elements 21 for engaging the outer race 17A and the fixed ring 15A together when the outer race 17A rotates relative to the fixed ring 15A, and a retainer 22A for displacing the engagement elements 21 between the engaged operative position and the non-engaged position are incorporated in between mutually confronting, respective surfaces of the outer race 17A and the fixed ring 15A. Each of the engagement elements 21 is in the form of a roller which concurrently serves as a rolling element for supporting the outer race 17A for rotation relative to the fixed ring 15A.

The retainer 22A is interlocked with the input side ring 16A and the input side ring 16A is in turn integrated together with the input shaft 16. The connecting means 70 is provided for connecting the input side ring 16A and the outer race 17A, that is the output side ring, for play relative to each other through a predetermined angle. The fixed ring 15A has an outer peripheral surface which is a cylindrical surface 26A, and the outer race 17A has an inner peripheral surface formed with a plurality of cam faces 27A. Each of the cam faces 27A is of a generally V-shape section so that it can cooperate with the cylindrical inner peripheral surface 26A to define opposite wedge spaces on leading and trailing sides with respect to the direction of rotation.

The connecting means 70 includes a play recess 25A defined in the retainer 22A and defining an engaged portion, and a switching pin 24A fixed to the outer race 17A and loosely inserted into the play recess 25A for movement in a direction circumferentially of the outer race 17A. The outer race 17A is rotatably connected with the pulley 32 either directly or through the output shaft 17. The pulley 32 is rotatably mounted externally on a shaft portion 15Aa that is an integral part of the fixed ring 15A.

As such, even where the cam faces 27A are formed on the side of the outer race 17A, the reverse input limiting function can be obtained wherein although rotation can be transmitted from the input side ring 16A to the outer race 17A that is the output side ring, no rotation can be transmitted from the outer race 17A to the input side ring 16A, as is the case with the clutch assembly 6 according to the previously described first embodiment of the present invention. Also, the reverse input limiting function can be obtained for rotation in the respective directions. It is to be noted that in the case of the clutch assembly 6A shown in FIG. 15, the pulley 32 may be provided externally on the outer race 17A.

Figure 16:
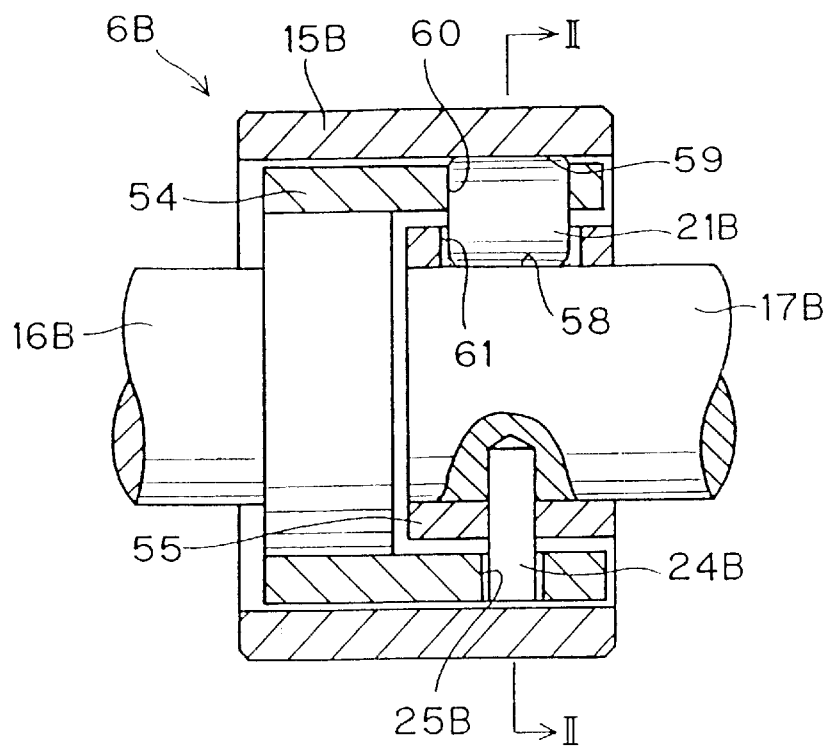
FIG. 16 is a longitudinal sectional view showing another modified form of the clutch assembly employed in the wheel steering apparatus shown FIG. 14.
Figure 17:
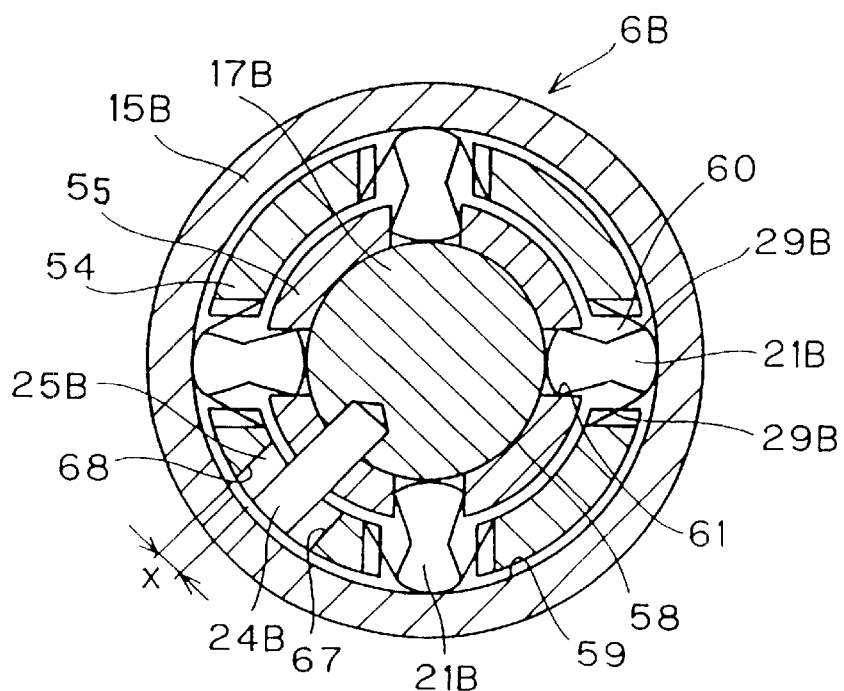
FIG. 17 is a transverse sectional view of the clutch assembly shown in FIG. 16.
Figure 18:
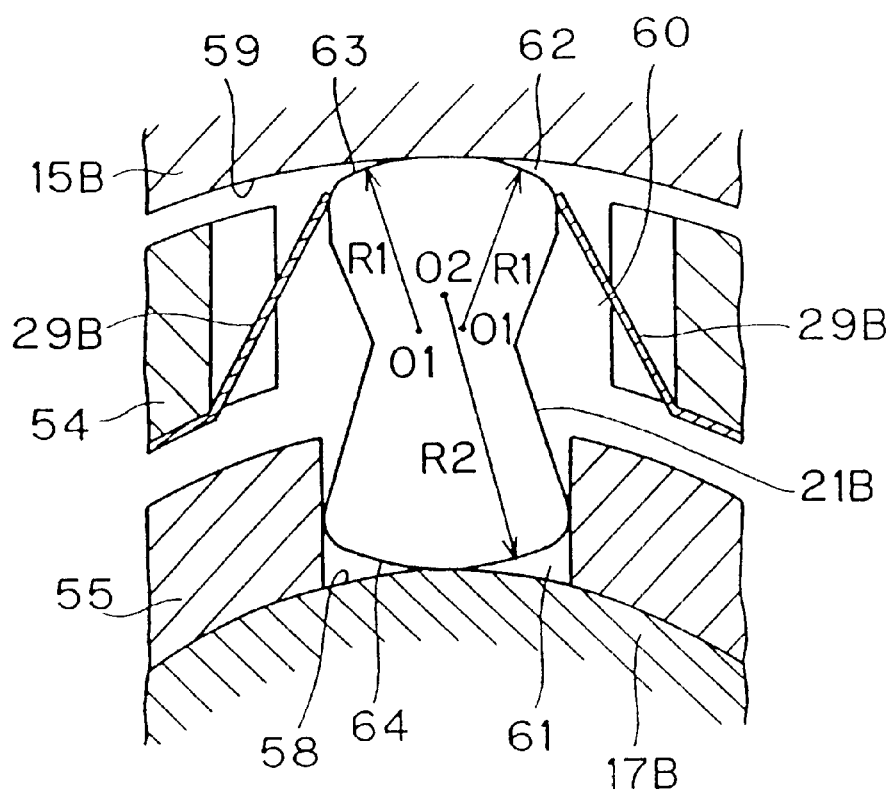
FIG. 18 is a fragmentary transverse sectional view of a portion of the clutch assembly of FIG. 16, showing the details of an engagement element employed therein.

Another one of the modified clutch assemblies used as the reverse input limiting means is shown in FIGS. 16 to 18. The clutch assembly identified by 6B in FIGS. 16 to 18 employs the engagement elements 21B each in the form of a sprag.

The outer race 15B is fixed to a casing (not shown) that is a stationary system. The outer race 15B has an inner peripheral surface that is a cylindrical surface 59. Input and output shafts 16B and 17B are inserted into the outer race 15B from opposite ends thereof along a longitudinal axis of the outer race 15B, with a cylindrical outer retainer 54 press-fitted externally on the outer peripheral surface of the input shaft 16B. The output shaft 17B has an outer peripheral surface that is a cylindrical surface 58 coaxial with the cylindrical inner peripheral surface 59 of the outer race 15B, and a cylindrical inner retainer 55 is fixed to the cylindrical outer peripheral surface 58 of the output shaft 17B by means of a switching pin 24B that is tapped into the output shaft 17B through the cylindrical inner retainer 55. Each of the outer and inner retainers 54 and 55 are formed with a plurality of pockets 60 or 61 that are spaced an equal distance from each other in a direction circumferentially thereof. The engagement elements 21B in the form of the sprags and elastic members 29B for retaining the associated engagement elements 21B are accommodated in part within the pockets 60 in the outer retainer 54 and in part within the pockets 61 in the inner retainer 55. Each of the elastic members 29B may be a spring element such as a leaf spring or the like.

Each of the engagement elements 21B in the form of the sprag has two cam faces 62 and 63 defined therein at a location adjacent the outer periphery and a cam face 64 defined therein at a location adjacent the inner periphery. Each of said cam faces 62 and 63 has a radius of curvature R1 with the center of curvature indicated by O1 while the cam face 64 has a radius of curvature R2 with the center of curvature indicated by O2. Those cam faces 62 to 64 in each engagement element 21B are so designed and so shaped that when the respective engagement element 21B tilts in the circumferential direction, the cam faces 62 and 64 (or when the respective engagement element 21B tilts in the opposite direction, the cam faces 63 and 64) can be brought into contact with the cylindrical inner peripheral surface 59 of the outer race 15B and the cylindrical outer peripheral surface 58 of the output shaft 17B, respectively, to assume the engaged operative position (in a condition in which the clutch assembly is engaged).

So long as the input shaft 16B is held in a neutral position with the output shaft 17B in the circumferential direction, the respective elastic member 29B urges the corresponding engagement element 21B in the form of the sprag from opposite directions to erect such engagement element 21B wherefore the engagement element 21B can assume the neutral position in which the engagement element 21 does not engage any one of the cylindrical inner and outer peripheral surfaces 59 and 58.

On the other hand, the switching pin 24B extending radially as shown in FIG. 17 is fixed to a surface of the output shaft 17B, with its free end portion engaged in a play recess 25B such as, for example, a generally rectangular opening that is defined in the outer retainer 54. The play recess 25B when being formed leaves circumferentially spaced, opposite side walls 67 and 68 on respective sides thereof, and a play zone X is defined between each of the side walls 67 and 68 and the switching pin 24B within which the outer retainer 54 and, hence, the input shaft 16B can rotate a limited angle relative to the output shaft 17B. As shown in FIG. 18, the magnitude of this play zone X is so chosen as to be substantially equal to the angular distance over which the respective engagement element 21B in the form of the sprag can move from the neutral position, in which it does not engage, to the engaged operative position.

Figure 19:
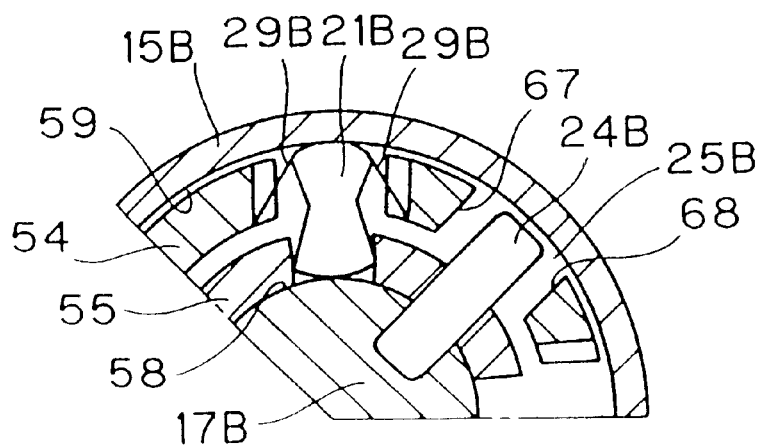
FIG. 19 is a fragmentary transverse sectional view of that portion of the clutch assembly of FIG. 16, showing an input shaft of the clutch assembly being held at a halt.

The clutch assembly 6B shown in FIGS. 16 to 18 operate in the following manner. So long as the input shaft 16B is held at the neutral position relative to the output shaft 17B in the circumferential direction, the engagement elements 21B are, by the biasing action of the elastic members 29B, held at the neutral position in which they do not engage between the cylindrical inner and outer peripheral surfaces 59 and 58 as shown in FIG. 19. Assuming that the input shaft 16B is rotated in a clockwise direction as shown by the arrow in FIG. 20, the outer retainer 54 fixed to the input shaft 16B also rotates. By the rotation of the outer retainer 54, the elastic members 29B cause the engagement elements 21B in the form of the sprags to tilt with the cam faces 62 and 64 (or 63 and 64) of the engagement elements 21B then brought into engagement with the cylindrical inner peripheral surface 59 of the outer race 15A and the cylindrical outer peripheral surface 58 of the outer shaft 17B with the clutch assembly 6B consequently held in the engaged operative position.

Figure 20:
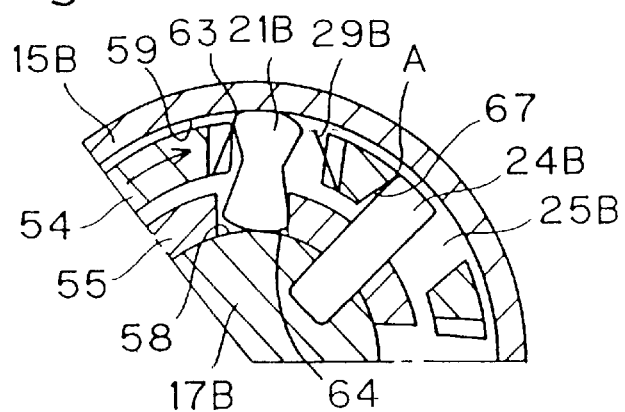
FIG. 20 is a view similar to FIG. 19, showing the input shaft of the clutch assembly being driven.

However, since at this time by the rotation of the outer retainer 54, the wall face 67 (or 68) of the play recess 25B and the switching pin 24B fixed to the output shaft 17B contact with each other at a point of contact A as shown in FIG. 20, the input shaft 16B (and, hence, the outer retainer 54) and the output shaft 17B (and, hence, the inner retainer 55) rotate simultaneously together with the engagement elements 21B. At this time, although the engagement elements 21B are in the engaged operative condition, rotation of the output shaft 17B causes the engagement elements 21B to receive a load from friction at the point of contact with the cylindrical inner peripheral surface 59 of the outer race 15B so as to erect and, therefore, the rotation of the input shaft 16B can be transmitted to the output shaft 17B without the engagement elements 21B being clamped.

Figure 21:
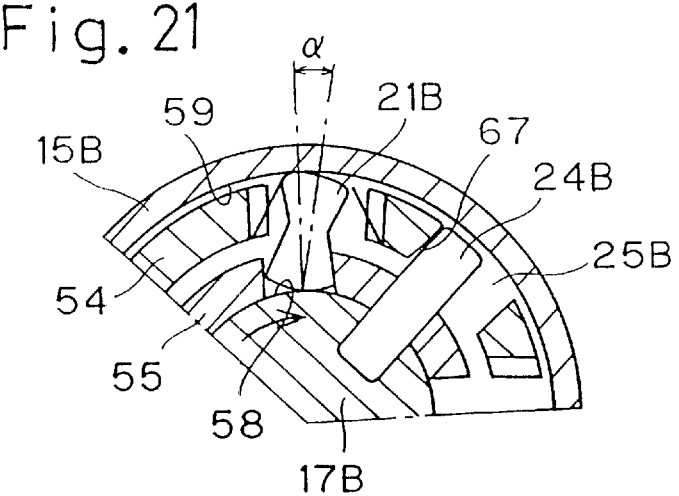
FIG. 21 is a view similar to FIG. 19, showing an output shaft of the clutch assembly being reverse-driven.

On the other hand, if a reactive force is produced on the side of the output shaft 17B and the output shaft 17B is consequently tended to rotate clockwise as shown by the arrow in FIG.21, the engagement elements 21B in the form of the sprags are tilted a predetermined wedge angle α to engage the cylindrical inner and outer peripheral surfaces 59 and 58. As a result of this, rotation of the output shaft 17 is halted and will not be transmitted to the input shaft 16B.

Figure 22:
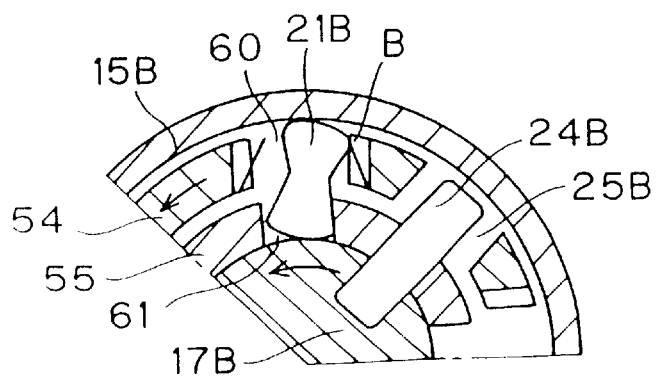
FIG. 22 is a view similar to FIG. 19, showing the clutch assembly in a clamp release position.

Considering the case in which the engagement elements 21B shift from the condition in which they are engaged as shown towards the condition in which they cause the input shaft 16B to rotate, in the event that the input shaft 16B in the first place is rotated clockwise as viewed in FIG. 21, the switching pin 24B is brought into engagement with the wall face 67 of the play recess 25B in the outer retainer 54 and, therefore, the output shaft 17B rotate clockwise as well. Upon clockwise rotation of the output shaft 17B in this manner, the engagement elements 21B run idle under the influence of a frictional force generated as a result of contact with the cylindrical inner peripheral surface 59 of the outer race 15B, in a direction required for the engagement elements 21B to erect, with the output shaft 17B consequently rotated by the input shaft 16B. On the other hand, if the input shaft 16B is rotated counterclockwise as viewed in FIG. 22, the engagement elements 21B come into contact with an inner side face of the pocket 60 of the outer retainer 54 at a point of contact B, and consequently, the engagement elements 21B engaged with the cylindrical inner and outer peripheral surfaces 59 and 58 are erected to release the engagement and, accordingly, a reverse rotation is possible.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel steering apparatus comprising:
a reciprocatingly movable rod drivingly connected with a support member for steerably supporting a wheel;
a ball screw mechanism including an outer helical groove defined on at least a portion of an outer periphery of the rod, a nut member having an inner peripheral surface formed with an inner helical groove defined therein and relatively rotatably mounted on the rod with the inner helical groove aligned with the outer helical groove, and a series of balls rollingly accommodated in part within the outer helical groove and in part within the inner helical groove, said nut member being driven by a drive motor for reciprocatingly moving the rod to steer the wheel, said drive motor having a rotor; and
a reverse input limiting means provided in a rotational transmission system for transmitting rotation of the drive motor to the nut member, said reverse input limiting means being operable to prevent the rotor of the drive motor from being rotated in response to an external force acting on the wheel.

2. The wheel steering apparatus as claimed in claim 1, wherein the reverse input limiting means comprises a clutch assembly operable to transmit rotation from a rotatable input side ring to a rotatable output side ring, but preventing transmission of the rotation from the output side ring to the input side ring.

3. The wheel steering apparatus as claimed in claim 2, wherein the reverse input limiting means comprises the clutch assembly, wherein the rotor of the drive motor and the nut member are drivingly coupled with the input side ring and the output side ring, respectively, and wherein said clutch assembly comprises an outer race fixed to a stationary member, said input side ring and the output side ring being inserted axially into the outer race from opposite ends thereof to permit the outer race to rotatably support the input side ring and the output side ring; a plurality of engagement elements disposed between mutually confronting surface of the outer race and the output side ring for engaging the outer race and the output side ring together when the outer race and the output side ring undergo a relative rotation; and a retainer fixedly connected with the input side ring for displacing the engagement elements between an engaged operative position and a non-engaged position, said retainer and said output side ring being connected with each other for angular play in a direction of rotation.

4. The wheel steering apparatus as claimed in claim 3, wherein the engagement elements are operable to engage the outer race and the input side ring with each other in two directions with respect to the direction of rotation.

5. The wheel steering apparatus as claimed in claim 2, wherein component parts of the clutch assembly and the nut member of the ball screw mechanism are integrated together to form respective parts of one-piece component.

6. The wheel steering apparatus as claimed in claim 5, wherein the one-piece component includes the output side ring and the nut member of the ball screw mechanism integrated together and wherein the clutch assembly comprises an outer race fixed to a stationary member, said output side ring of the one-piece component being provided rotatably coaxially of the outer race; a plurality of engagement elements disposed between mutually confronting surface of the outer race and the output side ring for engaging the outer race and the output side ring together when the outer race and the output side ring undergo a relative rotation; and a retainer fixedly connected with the input side ring for displacing the engagement elements between an engaged operative position and a non-engaged position, said retainer being interlocked with the input side ring, said retainer and said output side ring being connected with each other for angular play in a direction of rotation.

7. The wheel steering apparatus as claimed in claim 6, wherein the output side shaft has an outer surface formed with a flat cam face or two directional cam face portions inclined in respective directions opposite to each other in the direction of rotation, and further comprising rollers interposed between the cam face portions and the outer race, each of said rollers serving as the respective engagement element.

* * * * *